June 15, 1954
R. L. BAUMGARTNER
2,680,858
TOP COVER FOR BEEHIVES
Filed Nov. 17, 1952
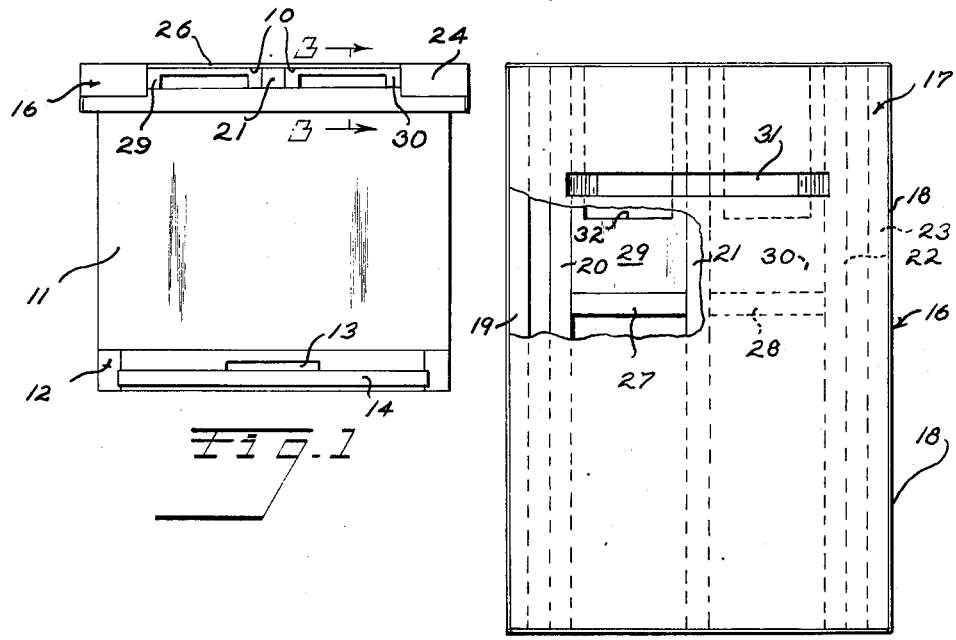
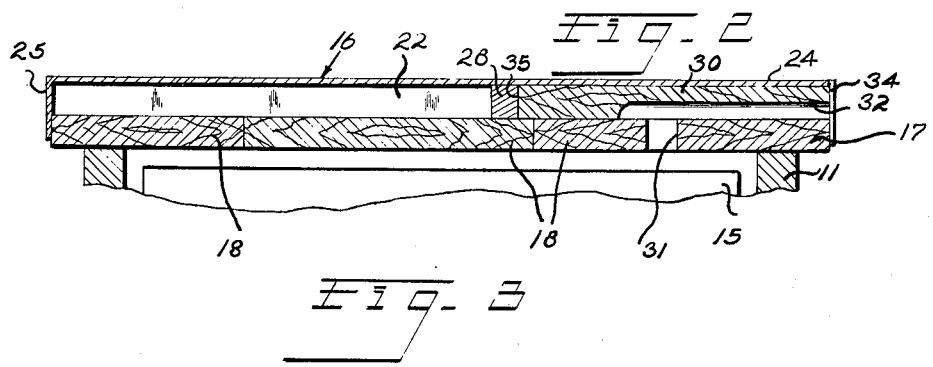
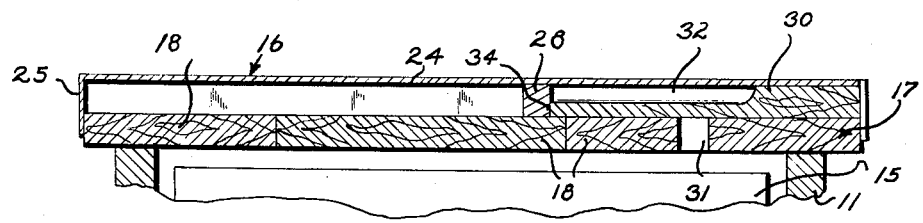
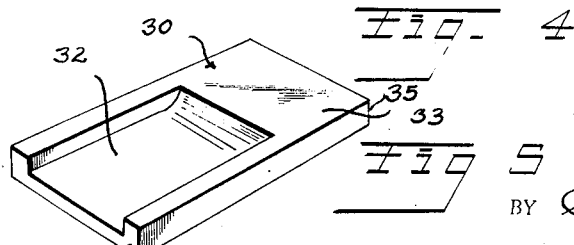
INVENTOR
Roy L. Baumgartner
BY *Strauch, Nolan & Diggins*
ATTORNEYS

UNITED STATES PATENT OFFICE 2,680,858

TOP COVER FOR BEEHIVES

Roy L. Baumgartner, Nampa, Idaho

Application November 17, 1952, Serial No. 320,886

6 Claims. (Cl. 6—1)

This invention relates to top covers for bee hives and an improved bee hive assembly and is particularly concerned with such an improved top cover provided with an optionally available bee entrance and exit opening.

The conventional bee hive comprises a hive body, a bottom board which functions as the floor of the body and is provided with a bee entrance and exit opening, and a top cover for the body. The body contains a plurality of removable frames in which the bees deposit honey. My invention is concerned with a novel top cover that affords an additional bee entrance and exit opening, and also provides improved ventilation of the entire hive.

In regions where there is considerable snow two major difficulties are encountered by bee operators. One is that snow or ice often closes the bottom board bee entrance and exit opening, and the other is that moisture accumulating within the hive creates a condition of dampness that often results in the bees contracting dysentery or other diseases. This causes a reduction in efficiency and usually loss of large numbers of bees. The top cover of the present invention overcomes both of these difficulties by providing, at the bee operator's will, a top opening for bee entrance and exit which is much less likely to become closed and which greatly aids air circulation within the hive so as to remove dampness.

It is therefore the major object of my invention to provide a novel bee hive top cover having an opening for bee entrance and exit and ventilation of the entire hive.

A further object of the invention is to provide a bee hive top cover having an optionally openable and closable opening to the hive body.

It is a further object of the invention to provide a novel bee hive top cover having an opening controlled by a reversible member that in one position closes the opening and in another position provides a passage through the cover to the hive body.

Further objects of the invention will presently appear as the description proceeds in connection with the appended claims and the annexed drawings wherein:

Figure 1 is a front elevation of an otherwise conventional bee hive provided with a top cover according to a preferred embodiment of the invention;

Figure 2 is a bottom plan view of the top cover of Figure 1, with the bottom wall partially broken away to show the plug and guide arrangements;

Figure 3 is an enlarged section on line 3—3 Figure 1, showing the plug in passage defining position;

Figure 4 is a section similar to Figure 3 but with the plug reversed to close the opening; and Figure 5 is a perspective view of the plug of Figures 3 and 4.

The bee hive of Figure 1 comprises a conventional hive body 11 having its open bottom resting on a bottom board assembly 12 having a side opening 13 just above a forwardly projecting shelf 14. This opening 13 affords bee entrance and exit from outside into the interior of the hive body where the usual honey frames 15 are disposed. The bottom board assembly 12 may be of any suitable construction without departing from the spirit of this invention.

The top of the hive body 11 is open above the honey frames as shown in Figures 3 and 4, and the cover 16 of the invention having side openings 10 rests on the hive body.

In the illustrated embodiment, cover 16 comprises a bottom wall 17 which may be made up of three wooden boards 18 nailed in close side-by-side, preferably interlocked edge, contact to a plurality of spaced parallel wooden strips 19, 20, 21, 22 and 23. A sheet 24 of galvanized iron or like sheet metal overlies these wooden strips and its edges 25 are bent over and nailed or similarly secured to the strips and boards all around the cover except at the front where it is cut away at 26 (Figure 1) for a purpose to appear. Sheet 24 serves as a waterproof top wall for the cover and it cooperates with the strips and the boards to enclose the space between the top and bottom walls of the cover except for the cover side openings 10.

As illustrated in Figure 2, aligned short cross strips 27 and 28 are secured fixedly to the cover between strips 20 and 21 and 21 and 22 respectively. Besides helping to support the metal sheet 24 from below, these strips 27 and 28 function as stops to limit inward sliding of two plugs 29 and 30. A narrow slot 31 which is parallel to strips 27 and 28 and extends at least from strip 20 to strip 22 is cut through bottom wall 17 to provide an opening therethrough that (Figure 3) will be above the open top of the hive body when cover 16 is on the hive. The bottom surface of wall 17 is preferably smooth and continuous across the hive body except for opening 31.

Plugs 29 and 30 are identical and each comprises a rectangular wooden block flat on all surfaces. Plugs 29 and 30 are of such width as to be insertible through the cover side openings 10 and slide snugly between strip 21 and the longitudinal strips 20 and 22, and of such thickness as to slide snugly between bottom wall 17 and the sheet metal top wall 24.

Each of plugs 29 and 30 has a channel 32 cut into a surface 33, and the channel opens at one end only through end face 34 as shown best in Figure 5. The other end face 35 of the plug is solid.

Plugs 29 and 30 are reversible between the positions shown in Figures 3 and 4 without changing any other part of the structure physically. In the Figure 3 position the plugs have been inserted with channel 32 facing down until end faces 35 contact stops 27 and 28. This provides clear unobstructed bee and air passage from the interior of the hive body through opening 31 and channels 32 to the outside atmosphere. With the plugs so disposed, ventilating air may freely circulate from bottom to top within the hive body, entering at 13 and traversing the hive body like a chimney to exit through the plugs. Such circulation prevents accumulation moisture within the hive and keeps the bees healthy. Furthermore, should bottom opening 13 be obstructed, the bees have available top cover passage through the plugs for free entrance and exit with respect to the hive. This top cover opening is very often maintained in this position winter and summer for ventilating purposes. In winter it is usually located at the front of the hive as illustrated, but in summer the cover is usually turned to locate it at the rear so that the bees will tend to use the conventional lower opening as much as possible.

When the plugs are in the Figure 4 position, they are reversed end for end with respect to the Figure 3 or winter position, preferably with channels 32 facing upwardly. This closes off cover opening 31 so that the top cover becomes substantially the same as the previously used covers that had no top cover opening. If desired only one plug may be in the position of Figure 3 and the other in the position of Figure 4 to provide a reduced opening with less updraft.

It will also be appreciated that the physical structure of the top cover of the invention may be considerably varied without departing from the spirit of the invention. For example, the number and arrangement of the longitudinal strips may be varied to suit conditions and sizes of hives. The closure elements can adopt other forms functionally equivalent to the plugs comprising the preferred embodiment of the invention.

The invention also enables a hive to be protected against damage due to field mice which, especially during the fall and winter months, may enter the hive through the conventional bottom opening to build nests and eat the wax on the frames. This can be prevented by closing off the conventional bottom opening entirely during that period.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by the United States Letters Patent is:

1. A top cover for a bee hive comprising fixedly spaced top and bottom walls enclosing the space between them, said cover having a side opening leading into said space and said bottom wall having an opening leading into said space, spaced guides between the walls, a stop located between the guides inwardly of said opening in said bottom wall, a reversible plug slidably mounted between said guides to close said bottom wall opening in one position, said stop limiting inward movement of said plug, and the surface of said plug being provided with a recess adapted to provide a passage through said cover between said openings in another position of the plug.

2. A top cover for a bee hive having a continuous bottom board assembly having an elongated slot, a plurality of spaced members secured along the top of said board assembly, a sheet metal top wall for said cover secured across said spaced members and coacting with said members to enclose the space above said board assembly, said cover having a side opening leading into said space, at least one multiposition plug slidably insertable through said side opening into and slidably mounted within said cover in the space between said bottom wall and top wall and extending over said slot, and a passage in said plug for connecting said openings with each other in one position of the plug within said space, said plug interrupting communication between said openings in another position.

3. A top cover for a bee hive comprising a bottom board having an opening, a plurality of strips secured along the top of said board adjacent said opening, a top wall secured across said strips and cooperating with said strips to close the space between said walls, said cover having a side opening leading into said space, and at least one reversible plug slidably mounted in said space between adjacent strips at said side opening, said plug being formed with means to provide a passage between said openings in one position and with means to block passage between them in another position.

4. A top cover for a bee hive comprising a plurality of spaced longitudinal strips, a continuous board secured across the bottoms of said strips and formed with an elongated opening substantially perpendicular to said strips, a top wall secured across said strips and cooperating with them to enclose the space above the board, said cover having a side opening, and a plurality of similar reversible plugs adapted to be slidably mounted within the space in said cover and insertable through said side opening to overlie said slot, said plugs being formed with means to provide a passage between said openings when disposed in one position and with means to close said side opening in another position.

5. A top cover for a bee hive comprising spaced top and bottom walls, said cover having a side opening leading into said space and said bottom wall having an opening leading into said space, and a reversible plug slidably mounted in said cover within said space and insertible through said side opening, said plug having a passage therethrough which in one position of the plug interconnects said openings, and said plug being formed on one side to block said bottom wall opening when in the reversed position of the plug.

6. In the top cover defined in claim 5, said passage being a channel recessed into the other side of said plug.

References Cited in the file of this patent

UNITED STATES PATENTS

| Number | Name | Date |
|---|---|---|
| 82,880 | Schneider | Oct. 6, 1868 |
| 1,122,697 | Danzenbaker | Dec. 29, 1914 |
| 1,816,631 | Brown | July 28, 1931 |
| 2,128,000 | King | Aug. 23, 1938 |
| 2,323,805 | Dzula | July 6, 1943 |
| 2,548,275 | Watkins | Apr. 10, 1951 |
| 2,578,103 | Stulce | Dec. 11, 1951 |
| 2,618,791 | Roselieb | Nov. 25, 1952 |